US012696021B2

(12) United States Patent
Huang et al.

(10) Patent No.: US 12,696,021 B2
(45) Date of Patent: Jul. 28, 2026

(54) SYSTEM FOR MUSIC VISUALIZATION AND A LOUDSPEAKER SYSTEM

(71) Applicant: HARMAN INTERNATIONAL INDUSTRIES, INCORPORATED, Stamford, CT (US)

(72) Inventors: Rongjian Huang, Shenzhen (CN); Jong-Ron Lo, Shenzhen (CN); Shuangju Wei, Shenzhen (CN)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 147 days.

(21) Appl. No.: 18/722,269

(22) PCT Filed: Dec. 21, 2021

(86) PCT No.: PCT/CN2021/140003
§ 371 (c)(1),
(2) Date: Jun. 20, 2024

(87) PCT Pub. No.: WO2023/115317
PCT Pub. Date: Jun. 29, 2023

(65) Prior Publication Data
US 2025/0063284 A1 Feb. 20, 2025

(51) Int. Cl.
*H04R 1/02* (2006.01)

(52) U.S. Cl.
CPC .................................... *H04R 1/028* (2013.01)

(58) Field of Classification Search
CPC ........ H04R 1/028; H04R 1/2834; H04R 3/00; F21Y 2115/10; G10H 2220/005;
(Continued)

(56) References Cited

U.S. PATENT DOCUMENTS

2004/0175014 A1 9/2004 Liu
2006/0018488 A1* 1/2006 Viala .................... H04R 1/1091 381/74
(Continued)

FOREIGN PATENT DOCUMENTS

CN 203225865 U * 10/2013
CN 209057324 U 7/2019
(Continued)

OTHER PUBLICATIONS

English machine translation of JP-2000261874-A (Hayakawa, Junichi; Speaker and Its Manufacture; published Sep. 2000) (Year: 2000).*
(Continued)

*Primary Examiner* — Mark Fischer
(74) *Attorney, Agent, or Firm* — BROOKS KUSHMAN P.C.

(57) ABSTRACT

The disclosure provides a system for music visualization and a loudspeaker system including the system for music visualization. The system may comprises: a passive radiator configured to be movable in a direction of excursion while music is being played; a plurality of lenses operably attached to the passive radiator and configured to move together with the passive radiator; and a plurality of light sources disposed relative to the plurality of lenses so that the light emitted from the plurality of light sources passes through the plurality of lenses and is projected on an environment surface to form at least one projected area.

18 Claims, 2 Drawing Sheets

(58) Field of Classification Search
CPC ............ G10H 1/0008; G10H 2220/081; F21V 14/06; F21V 33/0056; F21V 14/065; F21S 41/635
See application file for complete search history.

(56) References Cited

U.S. PATENT DOCUMENTS

| | | | | |
|---|---|---|---|---|
| 2007/0223770 | A1 | 9/2007 | Fujisawa et al. | |
| 2013/0028458 | A1* | 1/2013 | Suzuki | H04R 1/2834 381/338 |
| 2014/0192513 | A1* | 7/2014 | Yim | H04R 1/028 362/86 |
| 2016/0302285 | A1 | 10/2016 | Saijo et al. | |

FOREIGN PATENT DOCUMENTS

| | | | | |
|---|---|---|---|---|
| CN | 211880570 | U | | 11/2020 |
| CN | 211930869 | U | * | 11/2020 |
| CN | 212752551 | U | | 3/2021 |
| FR | 3098467 | A1 | | 1/2021 |
| JP | 2000261874 | A | * | 9/2000 |
| JP | 2002232987 | A | | 8/2002 |
| WO | 2021145151 | A1 | | 7/2021 |

OTHER PUBLICATIONS

English machine translation of CN-211930869-U (Li et al.; Bass horn for robot; published Nov. 2020) (Year: 2020).*
English machine translation of CN-203225865-U (Li, Jiangtao; Structure for improving low frequency characteristic of loudspeaker box; published Oct. 2013) (Year: 2013).*
Extended European Search Report dated Sep. 9, 2025 for European Application No. 21968470.1, 11 pages.
International Search Report dated Sep. 21, 2022 for PCT Appn. No. PCT/CN2021/140003 filed Dec. 21, 2021, 9 pgs.

* cited by examiner

SYSTEM FOR MUSIC VISUALIZATION AND A LOUDSPEAKER SYSTEM

CROSS-REFERENCE TO RELATED APPLICATIONS

This application is the U.S. National Phase of PCT Application No. PCT/CN2021/140003 filed on Dec. 21, 2021, the disclosure of which is hereby incorporated in its entirety by reference herein.

TECHNICAL FIELD

The present disclosure relates to a system for music visualization, and specifically relates to a system for music visualization used in loudspeaker applications, and a loudspeaker system using the music visualization system.

BACKGROUND

In recent years, with the development of speaker technology, various speaker or loudspeaker products that can provide users with a richer experience have been developed. For example, a light assembly can be provided on the speaker or loudspeaker products, so that the products themselves such as the outer surface of the products can present different lighting effects to match the beat of a music as the music is being played. In this configuration, the process of tying a beat of the music to light involves detecting the beat of the music by using software analysis and then controlling the light through a processing device. This typically causes a delay between the beat and the light being emitted.

Therefore, it is necessary to provide an improved technology to bring users a better experience for music visualization.

SUMMARY

According to one aspect of the disclosure, a system for music visualization is provided. The system may comprises: a passive radiator configured to be movable in a direction of excursion while music is being played; a plurality of lenses operably attached to the passive radiator and configured to move together with the passive radiator; and a plurality of light sources disposed relative to the plurality of lenses so that the light emitted from the plurality of light sources passes through the plurality of lenses and is projected on an environment surface to form at least one projected area.

According to one or more embodiments, the plurality of lenses may be arranged surrounding the passive radiator.

According to one or more embodiments, the system may further comprise a board for supporting the plurality of light sources.

According to one or more embodiments, the board may be a printed circuit board, and the plurality of light sources may be disposed on the circuit board and electrically coupled to the printed circuit board.

According to one or more embodiments, the board may be disposed on the passive radiator and may be movable together with the passive radiator.

According to one or more embodiments, the board may be not in contact with the passive radiator and be not movable together with the passive radiator.

According to one or more embodiments, the plurality of light sources may be configured to move with the passive radiator.

According to one or more embodiments, the at least one projected area may change with the movement of the passive radiator while the music is being played.

According to one or more embodiments, the system may further comprise a control unit coupled to the plurality of light sources and configured to control the plurality of light sources.

According to one or more embodiments, the control unit may be electrically coupled to the plurality of light sources via connection cables between the control unit and the plurality of light sources.

According to one or more embodiments, the control unit may be electrically coupled to the plurality of light sources via the printed circuit board.

According to one or more embodiments, the projected area may change in at least one of position, size, shape, color, brightness and pattern while the music is being played.

According to one or more embodiments, the system may be used for a loudspeaker system.

According to another aspect of the disclosure, a loudspeaker system is provided. The loudspeaker system may comprise the system for music visualization as described above.

According to one or more embodiments, the loudspeaker system may comprise a plurality of foot pads arranged in a bottom of the loudspeaker system, wherein the light passing through the lenses may be emitted from gaps between two adjacent foot pads.

Figure 1:
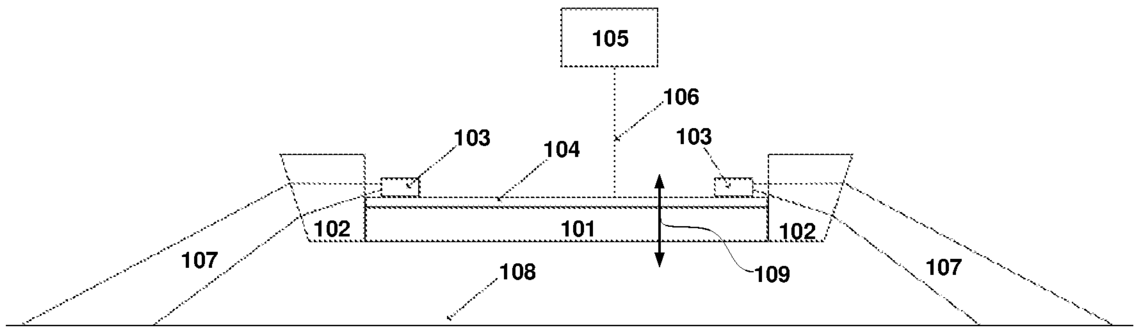
FIG. 1 illustrates a schematic diagram of the system for music visualization in accordance with one or more embodiments of the present disclosure.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION OF THE PREFERRED EMBODIMENTS

Examples will be provided below for illustration. The descriptions of the various examples will be presented for purposes of illustration, but are not intended to be exhaustive or limited to the embodiments. Many modifications and variations will be apparent to those of ordinary skill in the art without departing from the scope and spirit of the described embodiments.

In general, the present disclosure provides a system for music visualization, for example used for a loudspeaker system. The present disclosure further provides a loudspeaker system using the music visualization system. The loudspeaker system may include any small portable speaker, home speaker system, etc. The music visualization system may comprise a passive radiator, a plurality of optical lenses and a plurality of light sources. The passive radiator may be movable in a direction of excursion while a music is playing, for example moves up and down. The optical lenses may be operably attached to the passive radiator and may move together with the passive radiator. The light sources may be positioned with respect to the optical lenses so that the light emitted from the light sources can pass through the optical lenses and be projected on an environment surface to form at least one projected area.

By using the passive radiator in combination with the light sources to affect light passing through the lenses, the music visualization system may generate lighting effects to match the beat of a music. The passive radiator moves while music is being played, causing a change in the distance between the lens and the environment surface. The movement of the passive radiator causes light to be projected onto a different area of the environment surface, resulting in a change in the appearance of the light that perfectly matches the beat of the music. With the music visualization system and the loudspeaker system including the music visualization system in the present disclosure, the light being projected is directly linked to and controlled by physical movement of the passive radiator which eliminates any possibility for delay. In addition, the music visualization system in the present disclosure further provides a combination of physical movement of the passive radiator and another light controlling by a control unit, such as light controlling of color, brightness, flickering frequency etc., which additionally increases visualization effect and provides user with a better experience.

FIG. 1 illustrates a schematic diagram of a music visualization system in accordance with one or more embodiments of the present disclosure. As shown in FIG. 1, the system may comprise a passive radiator 101. A passive radiator is usually used in a loudspeaker system. For example, the passive radiator may be positioned in an enclosure of the loudspeaker system. The passive radiator may typically be similar to an active driver, but without a voice coil and magnet assembly. The passive radiator may typically increase the low frequency response, i.e., bass of a loudspeaker system. The passive radiator 101 moves, for example, in a direction of excursion 109 while music is being played. The louder and stronger the bass of the music being played, the more dramatically the passive radiator moves, that is, the greater the amplitude and speed of the movement of the passive radiator. For example, the higher the vibration amplitude and vibration frequency of the passive r radiator.

The system may further comprise a plurality of optical lenses 102. The optical lenses 102 may be operably attached to the passive radiator 101, and may move together with the passive radiator 101. In some embodiments, the optical lenses 102 may be distributed surrounding the passive radiator. According to implementation, the optical lenses 102 may be specially implemented with optical parameters to adapt the system and may receive lights and project lights. The optical lenses 102 with different parameters or different surface textures may be selected to generating different light patterns. For example, the light beam passing through the lenses may appears wider or narrower causing the project area of the light appears larger or small. For example, the project area of the light may appear different pattern due to the different surface textures of the lenses.

The system may further comprise light sources 103. The light sources 103 may be any light generator or component that can supplement lights. Each of the light sources 103 may be a light emitting diode (LED) light component or a LED array. The LED may be side-firing, up-firing, down-firing, or tilted at any angle. The light sources 103 may be disposed relative to the at least one optical lens so that the light emitted from the light sources can pass through the optical lenses 102. It is understood that FIG. 1 illustrates the components of the system, and is not intended to limit the positional relationship of system components. The light sources 103 can be arranged in any relative position relation with the passive radiator 101 and the optical lenses 102 as long as the light sources 103 can supplement light to the optical lenses 102.

In some embodiments, the light sources 103 may be supported by a board 104, for example a printed circuit board. The light sources 103 may be electrically coupled to the printed circuit board 104. In some embodiments, the light sources 103 may be disposed on the printed circuit board 104 and electrically coupled to the circuit board 104. The circuit board 104 may be operably connected to the passive radiator 101. In some examples, the circuit board 104 is disposed on a surface of passive radiator 101. For example, the circuit board 104 and the passive radiator 101 are glued together with a specific adhesive to ensure that the circuit board 104 will not fall off the passive radiator 101 when the passive radiator vibrates at a high frequency. In some embodiments, the circuit board 104 may not be directly connected the passive radiator 101 and may be fixed in the inner of the loudspeaker box via connection mechanism assuming that the light emitted from the light sources 103 may be supplied to the optical lenses 102.

In some embodiments, the light sources 103 may move together with the passive radiator 101. For example, the light sources 103, the printed circuit board 104 and the optical lenses 102 may all move together with the passive radiator 101. In the illustrated configuration shown in FIG. 1, for example, the passive radiator 101 may move in the direction of excursion 109 as the music is being played. Accordingly, the light sources 103, the printed circuit board 104 and the optical lenses 102 may move together in the direction of excursion 109, for example, up and down. The distance between the optical lenses 102 and the environment surface 108 changes with the beat of the music. The change in the distance causes light beams 107 to be projected onto a different area of the environment surface 108 to form a different projected area, with the beat of the music. The environment surface 108 may be any surface that can reflect light, including but not limited to any tables, floors, walls, etc. The change in different projected areas will result in a change in the appearance of the light effect that matches the beat of the music. For example, the projected area may change in position, size, shape, color, brightness, pattern, etc., and combination thereof while the music is being played.

In some embodiments, the light sources 103 may not move together with the passive radiator 101. For example, the light sources 103 and the printed circuit board 104 are not in any direct or indirect connection with the passive radiator 101. The light sources 103 may be positioned in a relative location to the optical lenses. The positions of the light sources 103 may ensure that at least some of the light emitted from the light sources can pass through at least one optical lens and even in the situation that the optical lenses are moving up and down with the movement of the passive radiator 101. While the passive radiator 101 as well as the optical lenses 102 are moving together as the music is being played, at least some of the light emitted from the light sources 103 pass through the optical lenses 102 and then are projected on different areas on the environment surface 108 due to the change in the distance between the optical lenses 102 and the environment surface 108, resulting in a change in the appearance of the light effect that matches the beat of the beat of the music. For example, the change of projected areas may include a location, size change, etc.

In some embodiments, the system may further comprise a control unit 105 for controlling the light sources 103. For example, the control unit 105 may detect music signals. Along with the rhythm or beat of the music, the control unit 105 controls the light sources 103 to emit light with different color, brightness or flickering frequency, etc.

In some embodiments, the control unit 105 may be coupled to the light sources 103 by one or more connection cables 106. The cable is durable enough to work for the whole life cycle of a product, while not generating any vibration noise. In some embodiments, the control unit 105 may be electrically coupled to and control the light sources 103 via the printed circuit board 104. For example, the control unit 105 may be a processor soldered on the printed circuit board 104. The processor may be any technically feasible hardware unit configured to process data and execute software applications, including without limitation, a central processing unit (CPU), a microcontroller unit (MCU), an application specific integrated circuit (ASIC), a digital signal processor (DSP) chip and so forth.

Figure 2:
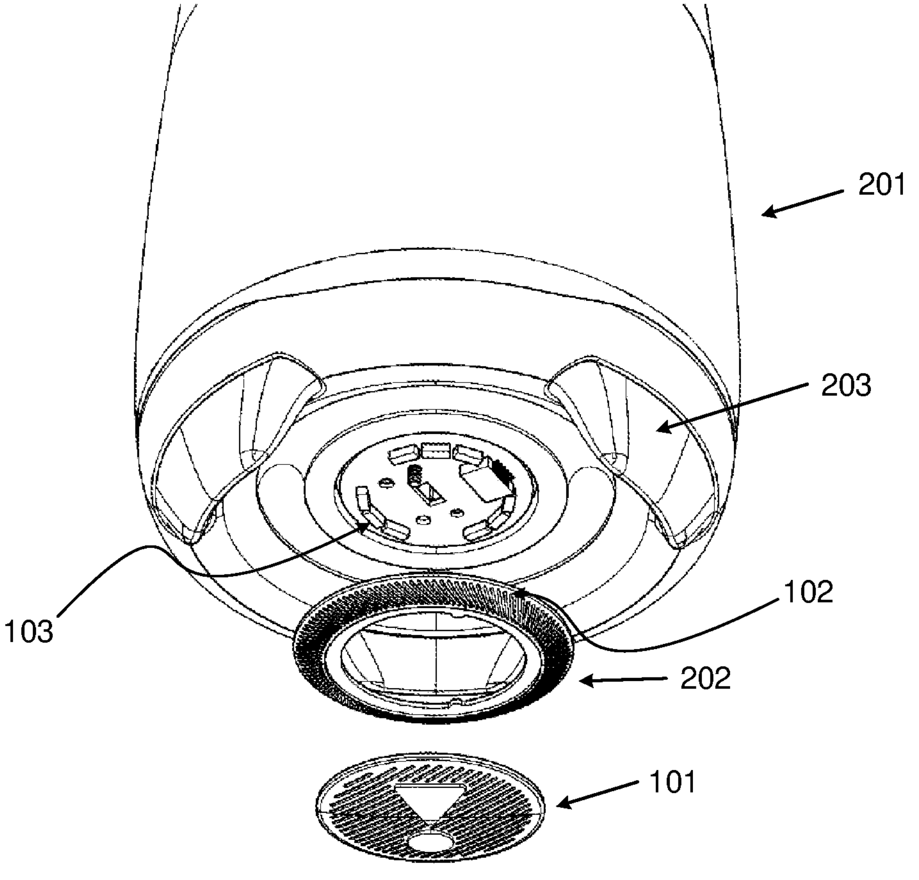
FIG. 2 schematically illustrates a perspective view of a loudspeaker system in accordance with one or more embodiments of the present disclosure, wherein a bottom view of the loudspeaker system is illustrated and some components are shown separately for clarity of presentation and explanation.
Figure 3:
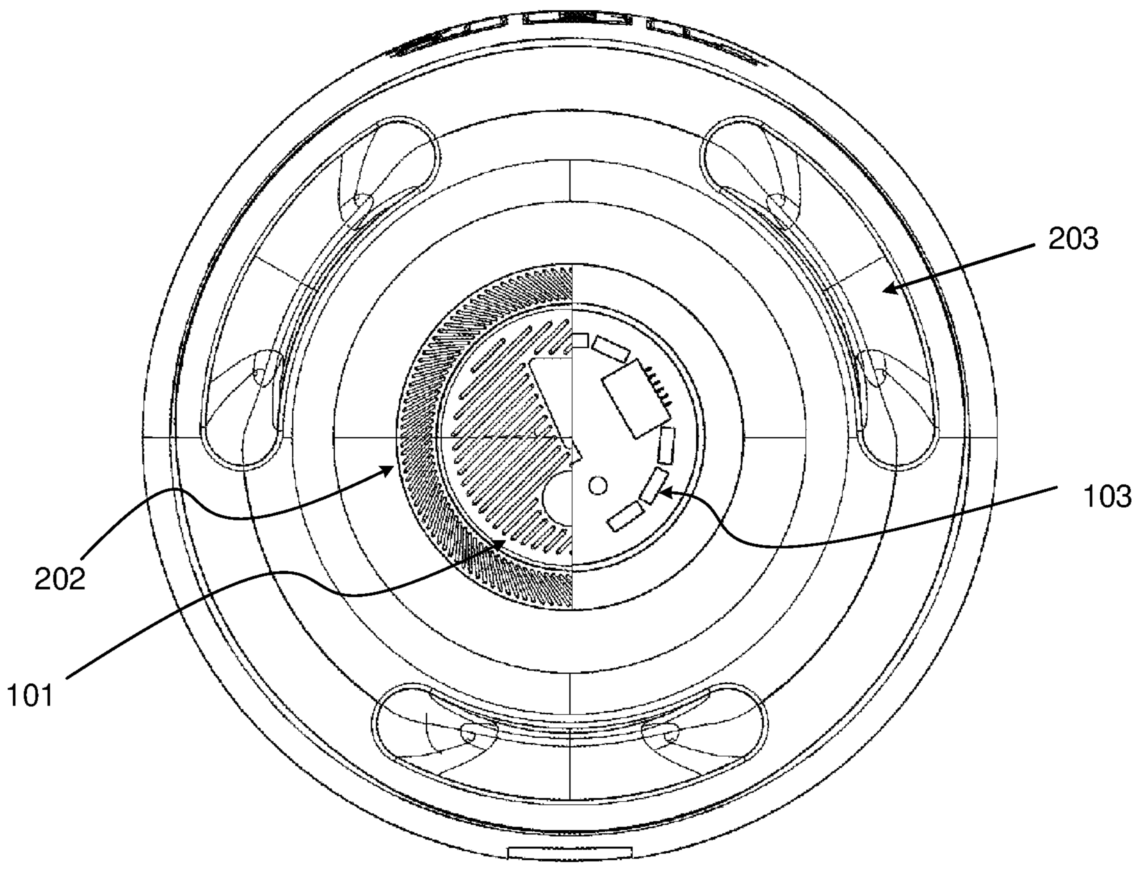
FIG. 3 schematically illustrates a bottom perspective, partially cutaway view of the loudspeaker system shown in FIG. 2.

FIG. 2 illustrates schematically illustrates a perspective view of a loudspeaker system in accordance with one or more embodiments of the present disclosure, wherein a bottom view of the loudspeaker system is illustrated and some components are shown separately for clarity of presentation and explanation. FIG. 3 schematically illustrates a bottom perspective, partially cutaway view of the loudspeaker system shown in FIG. 2.

With reference to FIG. 2 and FIG. 3, an exemplary loudspeaker system may include a housing 201, foot pats 203, and a music visualization system. The music visualization system includes a passive radiator 101, a lens element 202 with a plurality of optical lenses 102, and a plurality of light sources 103. The foot pads 203 arranged in a bottom of the loudspeaker system. The light passing through the lenses can be emitted from gaps between two adjacent foot pads. The foot pads 203 may additionally affect the appearance of the projected area, such as the shape, the pattern of the projected areas. Although the music visualization system is disposed at the bottom of the loudspeaker system in the example with reference to FIG. 2 and FIG. 3, it can be understood that the music visualization system can be positioned in any positions of the loudspeaker system according to the design requirement, such as the top, middle of the loudspeaker system. Moreover, it can be understood that the amounts of the foot pads can be set according to the design requirement, not limited to be three.

1. In some embodiments, a system for music visualization, comprising: a passive radiator configured to be movable in a direction of excursion while music is being played; a plurality of lenses operably attached to the passive radiator and configured to move together with the passive radiator; and a plurality of light sources disposed relative to the plurality of lenses so that the light emitted from the plurality of light sources passes through the plurality of lenses and is projected on an environment surface to form at least one projected area.
2. The system according to clause 1, wherein the plurality of lenses are arranged surrounding the passive radiator.
3. The system according to any one of clauses 1-2, further comprises a board for supporting the plurality of light sources.
4. The system according to any one of clauses 1-3, wherein the board is a printed circuit board, and the plurality of light sources are disposed on the circuit board and electrically coupled to the printed circuit board.
5. The system according to any one of clauses 1-4, wherein the board is disposed on the passive radiator and is movable together with the passive radiator.
6. The system according to any one of clauses 1-4, wherein the board is not in contact with the passive radiator and is not movable together with the passive radiator.
7. The system according to any one of clauses 1-5, wherein the plurality of light sources are configured to move with the passive radiator.
8. The system according to any one of clauses 1-7, wherein the at least one projected area changes with the movement of the passive radiator while the music is being played.
9. The system according to any one of clauses 1-8, further comprises a control unit coupled to the plurality of light sources and configured to control the plurality of light sources.
10. The system according to any one of clauses 1-9, wherein the control unit is electrically coupled to the plurality of light sources via connection cables between the control unit and the plurality of light sources.
11. The system according to any one of clauses 1-9, wherein the control unit is electrically coupled to the plurality of light sources via the printed circuit board.
12. The system according to any one of clauses 1-11, wherein the projected area changes in at least one of position, size, shape, color, brightness and pattern while the music is being played.
13. The system according to any one of clauses 1-12, wherein the system is used for a loudspeaker system.
14. In some embodiments, a loudspeaker system comprising the system for music visualization according to any one of clauses 1-13.
15. The loudspeaker system according to clause 14, further comprises a plurality of foot pads arranged in a bottom of the loudspeaker system, wherein the light passing through the lenses is emitted from gaps between two adjacent foot pads.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference sign is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

While the foregoing is directed to embodiments of the present disclosure, other and further embodiments of the disclosure may be devised without departing from the basic scope thereof, and the scope thereof is determined by the claims that follow.

What is claimed is:

1. A system for music visualization, comprising:
- a passive radiator configured to be movable in a direction of excursion while music is being played;
- a plurality of lenses operably attached to the passive radiator and configured to move together with the passive radiator, wherein the plurality of lenses is arranged to surround the passive radiator; and
- a plurality of light sources disposed relative to the plurality of lenses so that light emitted from the plurality of light sources passes through the plurality of lenses and is projected on an environment surface to form at least one projected area.

2. The system according to claim 1 further comprises a board for supporting the plurality of light sources.

3. The system according to claim 2, wherein the board is a printed circuit board, and the plurality of light sources are disposed on the printed circuit board and electrically coupled to the printed circuit board.

4. The system according to claim 2, wherein the board is disposed on the passive radiator and is movable together with the passive radiator.

5. The system according to claim 2, wherein the board is not in contact with the passive radiator and is not movable together with the passive radiator.

6. The system according to claim 1, wherein the plurality of light sources is configured to move with the passive radiator.

7. The system according to claim 1, wherein the at least one projected area changes with the movement of the passive radiator while the music is being played.

8. The system according to claim 1 further comprises a control unit coupled to the plurality of light sources and configured to control the plurality of light sources.

9. The system according to claim 8, wherein the control unit is electrically coupled to the plurality of light sources via connection cables between the control unit and the plurality of light sources.

10. The system according to claim 8, wherein the control unit is electrically coupled to the plurality of light sources via a printed circuit board.

11. The system according to claim 10, wherein the at least one projected area changes in at least one of position, size, shape, color, brightness and pattern while the music is being played.

12. The system according to claim 1, wherein the system is used for a loudspeaker system.

13. A loudspeaker system comprising the system for music visualization according to claim 1.

14. The loudspeaker system according to claim 13, further comprises a plurality of foot pads arranged in a bottom of the loudspeaker system, wherein the light passing through the lenses is emitted from gaps between two adjacent foot pads.

15. A system for music visualization, comprising:
- a passive radiator configured to be movable in a direction of excursion while music is being played;
- a plurality of lenses operably attached to the passive radiator and configured to move together with the passive radiator, wherein the plurality of lenses is arranged to surround the passive radiator; and
- a plurality of light sources disposed relative to the plurality of lenses to permit light emitted from the plurality of light sources to pass through the plurality of lenses and to project the light on an environment surface to form at least one projected area.

16. The system of claim 15 further comprises a board for supporting the plurality of light sources.

17. The system of claim 16, wherein the board is a printed circuit board, and the plurality of light sources are disposed on the printed circuit board and electrically coupled to the printed circuit board.

18. A loudspeaker system comprising:
- a passive radiator configured to be moved in a direction of excursion while music is being played;
- a plurality of lenses configured to move together with the passive radiator, wherein the plurality of lenses is arranged to surround the passive radiator; and
- a plurality of light sources disposed relative to the plurality of lenses to permit light emitted from the plurality of light sources to pass through the plurality of lenses and to project the light on an environment surface to form at least one projected area.

* * * * *